(No Model.)

A. HUTH.
FISHING ROD.

No. 364,350. Patented June 7, 1887.

Witnesses
F. H. Schott
Fred. E. Tasker

Inventor
Adolph Huth
By his Attorney John C. Tasker

UNITED STATES PATENT OFFICE.

ADOLPH HUTH, OF NEW YORK, N. Y.

FISHING-ROD.

SPECIFICATION forming part of Letters Patent No. 364,350, dated June 7, 1887.

Application filed December 17, 1886. Serial No. 221,878. (No model.)

*To all whom it may concern:*

Be it known that I, ADOLPH HUTH, a citizen of the United States, residing at New York, in the county of New York and State of New York, have invented certain new and useful Improvements in Fishing-Rods; and I do hereby declare the following to be a full, clear, and exact description of the invention, such as will enable others skilled in the art to which it appertains to make and use the same.

My invention relates to an improvement in fishing-rods; and it consists in an improved form of tip to be applied to the outer extremity of the rod for the purpose of affording the line a free and easy play in all directions; and the invention comprises, further, the construction and combination of the several parts of the tip, substantially as will be hereinafter described and claimed.

Figure 1:
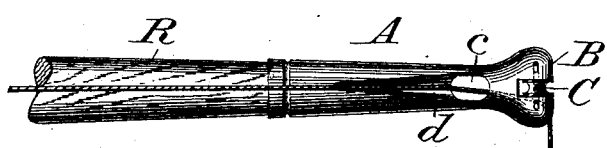
Figure 2:
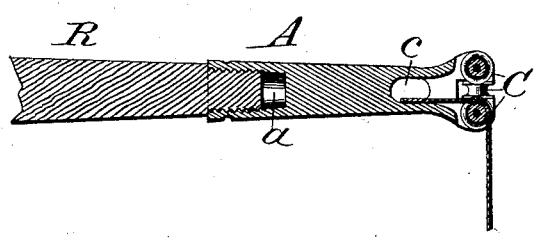
Figure 3:
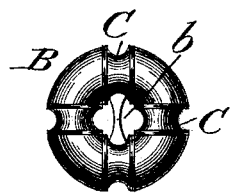

In the annexed drawings, illustrating my invention, Figure 1 is a plan view of the end portion of a fishing-rod provided with my improved tip. Fig. 2 is a longitudinal section of the same, and Fig. 3 is an enlarged end view of the tip.

Like letters of reference designate like parts in the various figures.

A represents the smooth metallic shank of my improved tip. It has a screw-threaded tubular opening, $a$, at the bottom, into which is inserted the end of the fishing-rod R. In this way the tip is securely fastened to the rod; but it is obvious that various other modes of securing the tip to the rod may be employed. The upper or topmost end of this shank is enlarged to form a head, B, which has a central tubular passage, $b$, extending through it longitudinally and passing downward into the shank until it meets the transverse slot or eye $c$. Along the opposite sides of the shank A are grooves $d$, which pass longitudinally from the eye $c$ until they gradually merge into the surface of the shank. They receive the line and conduct it into the passage $b$, whence it emerges at the end of the tip.

In the enlarged head B is journaled a circular series of four (or more or less) rollers or sheaves, C. These rollers are peripherally grooved. The head B is provided with radial slots, in which the rollers are journaled, all in the same plane, which is transverse to the shank. It will thus be seen that a certain portion of the wall of the tubular passage $b$ nearest the end of the tip will be formed by the peripheral surfaces of the rollers; hence the line which passes through the opening $b$ will, in whatever direction the rod may be turned, be allowed to rest upon and be guided by a roller. Thus the line will be always kept surely upon the end of the rod; it will have a free and easy movement; it cannot become entangled, nor will it be liable to be cut upon the sharp edges of the rod.

I am aware that fishing-rod tips have heretofore been provided with a single pulley for the purpose of giving an easy movement to the line, and likewise with other analogous devices for the same purpose. I do not, therefore, seek to broadly cover a fishing-rod tip having a roller; but,

Having thus described my invention, what I claim as new, and desire to secure by Letters Patent, is—

1. A tip for fishing-rods, consisting of a slotted shank and a circular series of rollers or sheaves journaled in the end of the shank around the passage $b$, substantially as described.

2. A tip for fishing-rods, comprising the shank A, having the eye $c$, groove $d$, and head B, with passage $b$, and the circular series of peripherally-grooved rollers C, journaled in the head about the passage $b$, substantially as described.

3. In a tip for fishing-rods, the shank with its tubularly-bored head, in combination with a series of four or more grooved rollers journaled in the head around the passage therein, substantially as described.

In testimony whereof I affix my signature in presence of two witnesses.

ADOLPH HUTH.

Witnesses:
 ANTON HUTT,
 JOHN MANNSMANN.